(12) United States Patent
Vroom

(10) Patent No.: US 11,047,457 B2
(45) Date of Patent: Jun. 29, 2021

(54) PREVENTING TORQUE-CAUSED IMPAIR OF A SLIDING SUPPORT MECHANISM

(71) Applicant: David H. Vroom, Tucson, AZ (US)

(72) Inventor: David H. Vroom, Tucson, AZ (US)

( * ) Notice: Subject to any disclaimer, the term of this patent is extended or adjusted under 35 U.S.C. 154(b) by 0 days.

(21) Appl. No.: 17/117,759

(22) Filed: Dec. 10, 2020

(65) Prior Publication Data

US 2021/0095745 A1     Apr. 1, 2021

Related U.S. Application Data

(63) Continuation of application No. 16/727,251, filed on Dec. 26, 2019, now Pat. No. 10,927,929, which is a continuation-in-part of application No. 16/666,184, filed on Oct. 28, 2019, now Pat. No. 10,883,577, which is a continuation of application No. 16/268,235, filed on Feb. 5, 2019, now Pat. No. 10,480,627.

(51) Int. Cl.
*F16H 19/04*     (2006.01)
*B60P 3/34*     (2006.01)

(52) U.S. Cl.
CPC .............. *F16H 19/04* (2013.01); *B60P 3/34* (2013.01)

(58) Field of Classification Search
CPC ................................. B60P 3/34; F16H 19/04
See application file for complete search history.

(56) References Cited

U.S. PATENT DOCUMENTS 10,851,885 B2 * 12/2020 Zulauf .................... F16H 19/04
10,864,842 B2 * 12/2020 Lopez ................... B60P 3/0252
10,882,438 B2 * 1/2021 Garceau ..................... B60P 3/34

FOREIGN PATENT DOCUMENTS

EP     3741614 A1 * 11/2020 ............. F16H 19/04

* cited by examiner

*Primary Examiner* — Terence Boes
(74) *Attorney, Agent, or Firm* — Yakov Sidorin; Quarles & Brady LLP

(57) ABSTRACT

Rack-and-pinion sliding support mechanisms and mechanical elements thereof. One or more shafts are coupled to pinions configured to engage with one or more racks and configured to be driven by one or more motors. The rack and pinion are configured to provide vertical and horizontal displacement to reduce premature component wear leading to poor gear mesh caused to by forces on the mechanism during use. Motor assembly in such support mechanism is modified—as compared to current industrial versions—to prevent the destruction of motor-assembly housing by torques generated by the one or more motors and transferred to the pinions, thereby reducing motor failures.

15 Claims, 13 Drawing Sheets

PREVENTING TORQUE-CAUSED IMPAIR OF A SLIDING SUPPORT MECHANISM

CROSS-REFERENCE TO RELATED APPLICATIONS

This application is a continuation of the U.S. patent application Ser. No. 16/727,251 filed on Dec. 26, 2019 and now published as US 2020/0248786, which is a continuation-in-part of the U.S. patent application Ser. No. 16/666,184, filed on Oct. 28, 2019 and now published as US 2020/0248785, which is in turn a continuation of the U.S. patent application Ser. No. 16/268,235, filed on Feb. 5, 2019 and now issued as U.S. Pat. No. 10,480,627. The disclosure of each above-identified application is incorporated herein by reference.

RELATED ART

Motorized sliding support mechanisms are well-known and used to support structures the positions of which need to be changed under different circumstances. An example is a motorized drawer. A more demanding example application is a "slide-out" module, commonly included in a recreational vehicle (RV) or motor home. RVs frequently include living spaces, which can be expanded when the vehicle is parked, to provide additional room. These "slide-outs" extend from the outer walls of the vehicle and are suspended over the ground. For convenience, and because slide-outs (or slide-out sections) can be extremely heavy, it is often desirable to equip them with a motorized mechanism or driver to automatically extend and retract the slide-out as desired. Some of these motorized mechanisms use a set of rack and pinions connected to the sides of the slide-out section(s). Electric motors drive the pinions, which are typically mounted in an assembly (including the motor and residing within a compartment within a side portion of the vehicle). The pinions, in turn, engage with the rack and drive a given slide-out forward or backward relative to the pinions.

Conventional motor-driven sliding support mechanisms—such as those currently used for RV slide-outs—have multiple structural and operational deficiencies. For example, the rack and pinions are prone to binding or degradation (e.g., abrasion and wear of teeth on the pinions and the corresponding grooves in the rack), which reduces the ability of the motor to slide the supported structure with the available electrical power. Some conventional mechanisms were observed to poorly gear mesh with the rack under common operating conditions. Additionally, some conventional mechanisms were proven to fail to solidly couple the motor to the shaft and other components, which led to severed motor wires when the mechanism experienced unexpected movements or forces. These and other problems may cause the motor to fail. Furthermore, the mechanisms coupling the motor to the pinions frequently make it difficult or impossible to move the mechanism manually in the event of a motor failure. In the example of an RV slide-out, these failures may occur in remote locations while also making it dangerous or impossible to drive the RV to a repair facility.

SUMMARY OF THE INVENTION

Improved sliding support mechanisms disclosed herein address at least several particular deficiencies of known motorized sliding support mechanisms. First, embodiments disclosed herein use racks and pinions configured to ensure proper meshing between the pinion teeth and rack grooves, even when the mechanism experiences mechanical forces which will tend to move these components out of alignment. For instance, when an RV slide-out is deployed, the racks may experience a downward force due to weight of the slide-out which is suspended beyond the walls of the RV. Similarly, if the slide-out has a non-uniform mass distribution, or the RV rests on an unleveled surface, the racks and pinions may experience lateral torques that will tend toward misalignment of the pinions with their corresponding racks.

Second, embodiments disclosed herein enable the motor(s) to remain solidly coupled to the shaft and other components at all times during operation of the mechanism, dramatically reducing the opportunity for damage to the motor(s) and any electrical connections due to stresses experienced during unexpected movements.

Third, the disclosed embodiments ensure that failures of the motor assemblies used in the motorized sliding support mechanisms are substantially prevented.

In particular, embodiments provide a sliding support mechanism having a main axis, which mechanism includes a) a first rack and a first pinion, the first pinion coupled to the first rack, the first rack having a-translational axis; b) a motor assembly having a drive motor and a gearbox enclosed in a first housing unit, and a rotor portion dimensioned to be partially inserted in said first housing unit when the motor assembly is complete, the rotor portion containing a rotor bearing housing and a rotor passing therethrough (here, the first housing unit includes a structural extension that protrudes radially with respect to the main axis and beyond a radial extent of the rotor portion, where structural extension disposed at an end of the first housing unit that faces the rotor portion); c) a shaft having a first end and a second end, the shaft coupled to both the rotor and to the first pinion at the first end of the shaft; d) a bearing configured to receive the shaft and encircle the shaft at a point between the rotor and the second end of the shaft; e) an upper housing coupled to the first end of the shaft and directly mechanically attached to said structural extension; and f) a lower pinion assembly coupled to the second end of the shaft, where the lower pinon assembly includes an aperture dimensioned to receive the second end of the shaft. The mechanism is configured such that, in a first state of operation, a fastener is positioned in the aperture such that the shaft and rotor are engaged; and in a second state of operation, the fastener is withdrawn by at least a fixed distance from the aperture, thereby disengaging the first end of the shaft from the rotor such that the first rack translates freely along the first translational axis when a force is applied to the support mechanism in a direction parallel to the first translational axis.

Embodiments additionally provide a sliding support mechanism is a recreational vehicle, which includes multiple sliding support mechanism units structured as stated above.

Embodiment further provide a motor assembly (for use in a sliding support mechanism). The motor assembly includes a drive motor enclosed in a motor housing; a set of gears housed in a gearbox housing that has first and second ends, and is coupled to the drive motor (here, the gearbox housing is affixed to the motor housing at a first end and has a collar at a second end). The motor assembly additionally includes a rotor assembly having a rotor bearing housing, a rotor bearing disposed therein, and a rotor shaft passing through the rotor bearing and coupled to the set of gears. Here, the rotor bearing housing is removably affixed to the gearbox housing at least at an outer periphery thereof, and a radial extent of the collar with respect to the axis exceeds a radial extent of the bearing housing with respect to the axis.

BRIEF DESCRIPTION OF THE DRAWINGS

Advantages of embodiments of the present invention will be apparent from the following detailed description of the examples of embodiments illustrated in the drawings, if which like elements and components are labelled with like numerals, and of which:

FIG. 6A: exploded perspective view of the modified motor assembly; FIG. 6B: partially-exploded perspective view of the modified motor assembly; FIG. 6C: partially-exploded perspective view of the modified motor assembly with a cut-out, showing the contents of the motor assembly housing.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION OF THE INVENTION

Aspects and elements of the invention are disclosed in the following description and related drawings directed to specific embodiments of the invention. Alternate embodiments may be devised without departing from the spirit or the scope of the invention. Additionally, well-known elements of discussed embodiments of the invention will not be described in detail or will be omitted so as not to obscure the relevant details of the invention. Further, to facilitate an understanding of the description, discussion of several terms used herein follows.

For ease of illustration, descriptions of embodiments herein make use of directional terms such as 'upper', 'lower', 'inner', 'outer', 'top', 'bottom', et al. It should be understood that these terms are not meant to limit the embodiments herein by required any preferred orientation and, rather, are used to make spatial relationships between various parts more readily understood with reference to the orientation of the figures. It should also be understood that substantially similar components are at times identified using a single reference number for clarity. For instance, each pinion belonging to a pair of pinions may be simply referred to as a pinion. It should also be understood that the present Application makes reference to slide-outs and other similar structures as examples only, to aid in understanding features and advantages of the invention, and not to limit the invention to the specific implementations of the slide-out and related structures.

Figure 1A:
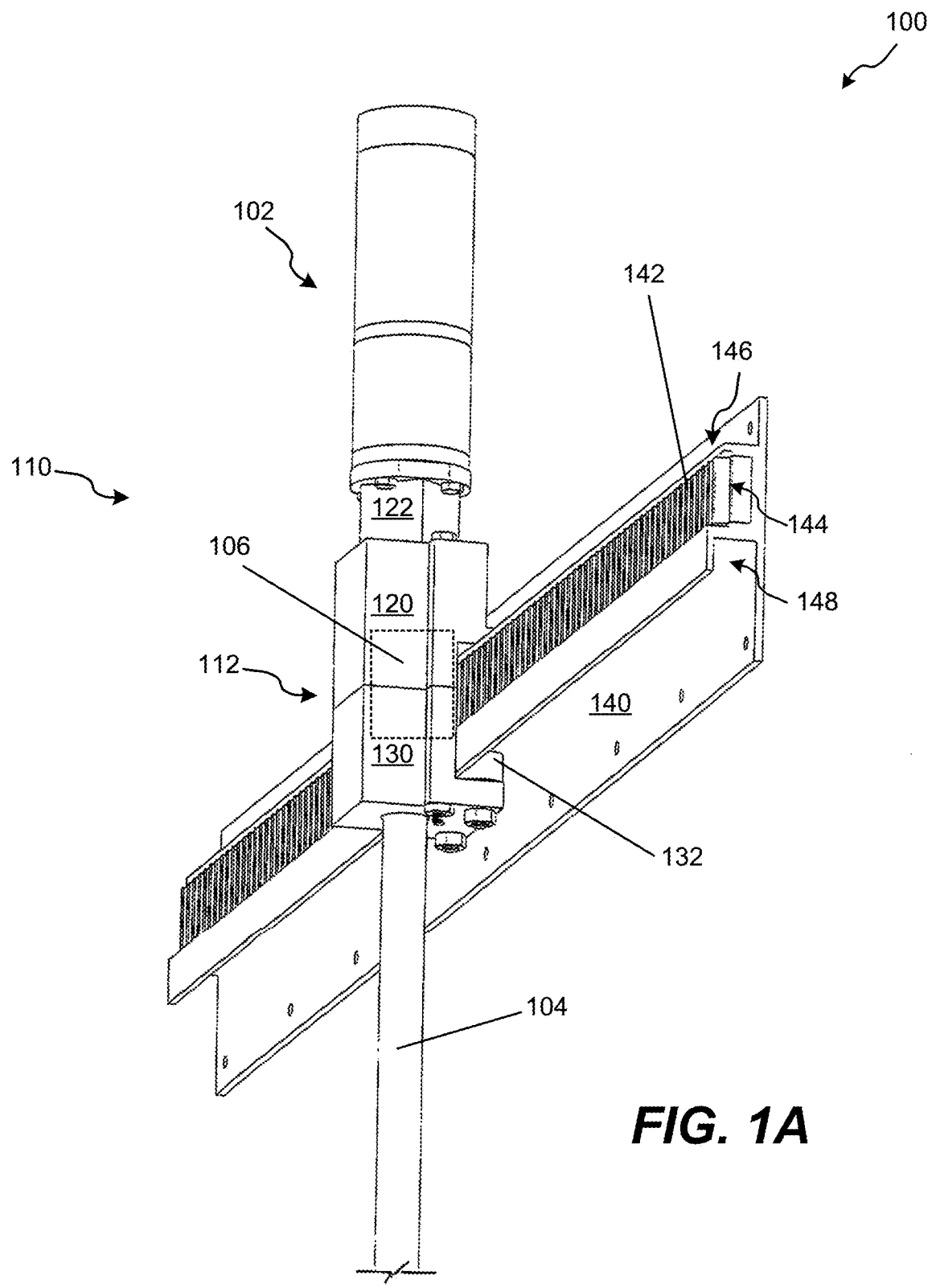
FIG. 1A is a perspective view of an embodiment of the sliding support mechanism configured according to an idea of the invention.
Figure 1B:
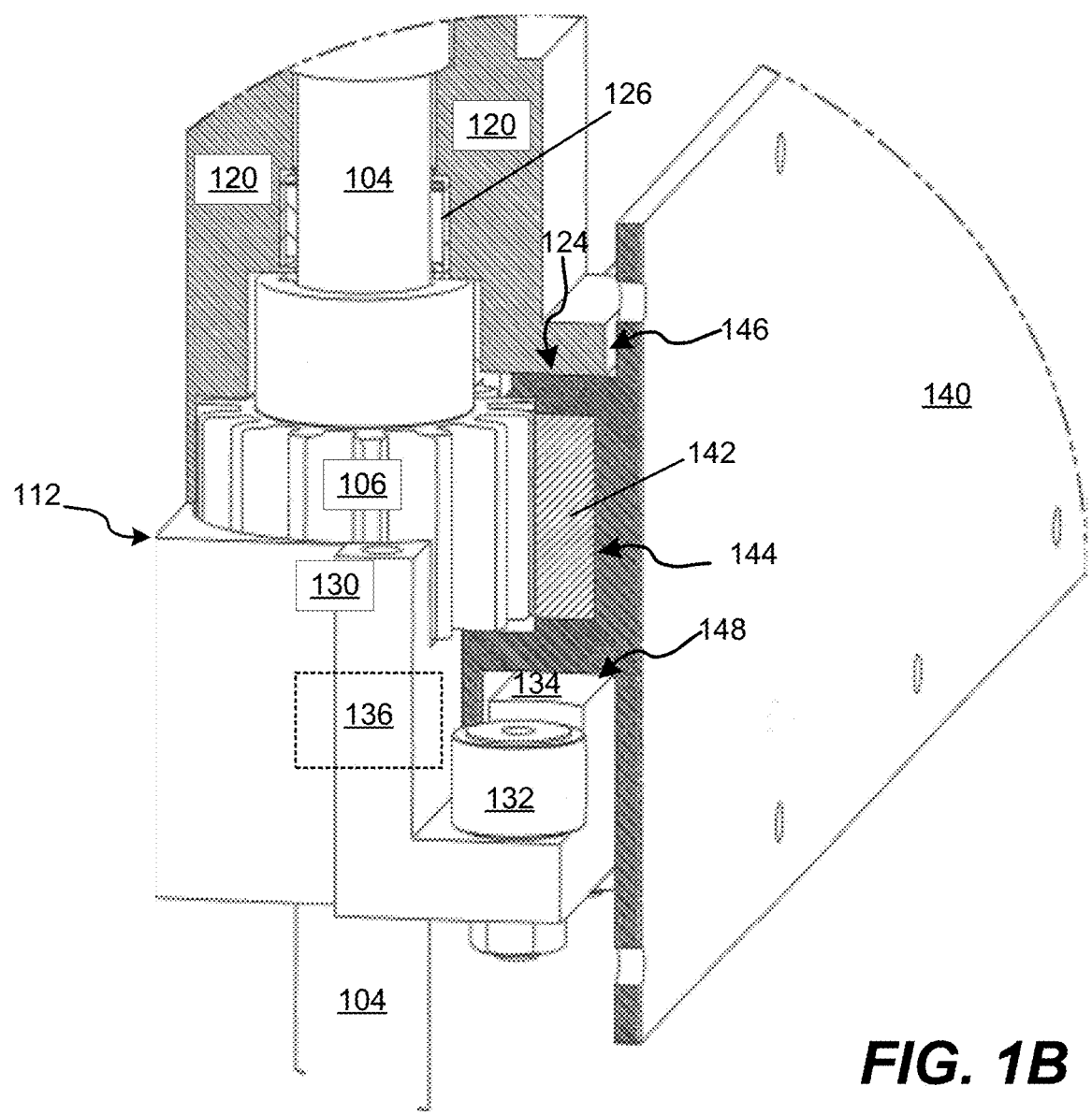
FIG. 1B is a cross-sectional perspective view showing further details of the embodiment of FIG. 1A.

FIGS. 1A, 1B illustrate key features of an example of a sliding support mechanism 100. Referring to FIG. 1A, the mechanism 100 includes a shaft assembly 110 and a rack assembly 140. As shown, the shaft assembly 110 includes a motor gearbox assembly 102) interchangeably referred to herein as a motor assembly), a shaft 104, a pinion 106, an upper shaft housing 120, and a lower shaft housing 130.

The motor assembly 102 is operationally attached to the upper shaft housing 120 with a motor coupling 122. The shaft assembly 110 is configured to couple to a rack 142. The shaft assembly 110 includes at least one pinion 106 (shown in detail in FIG. 1B), which is dimensioned to couple to the shaft 104 and to engage the rack assembly 140. The lower shaft housing 130 includes at least a pair of rollers 132 (one of which is shown in FIG. 1A). The upper and lower housings also include various wear surfaces and house at least one bearing (these elements, which are not shown in FIG. 1A, are described below with reference to FIG. 1B). For convenience, the upper shaft housing 120 and the lower shaft housing 130, taken together with the components they embrace or house or include, may be referred to as a pinion assembly 112.

The rack assembly 140 includes a rack 142 and a recess 144, in which the rack 142 is secured. The recess has a top surface 146, which forms a roof of the recess 144. The recess 144 includes a floor structure 148, which also forms or is dimensioned as an inverted U-shaped channel. The rack assembly 144 is shown with various holes to allow the rack assembly to be secured to an external object or structure (not shown) in order to enable this object or structure to be translated along the long axis of the rack 142.

When the shaft assembly 110 is coupled to the rack assembly 140, the rollers 132 rest within the channel 148 of the rack assembly 140. The rollers 132 are configured to roll or move along the channel 148, thereby reducing friction and allowing the motor gearbox assembly 102 to more efficiently drive or effectuate the linear motion of the rack assembly 140 relative to the shaft assembly 110. The rollers 132, acting together with the walls of the channel 148, also serve to keep the shaft assembly 110 (and particularly the pinion 106) in alignment with the rack 142, thereby countering any reactive back-torque on the rack 142 during operation of the motor assembly 102 as well as any external torques.

FIG. 1B is a hybrid cross-sectional perspective view with cutaways, illustrating certain features of the embodiment of FIG. 1A in greater detail. In particular, portions of the upper shaft housing 120 are not shown (removed from FIG. 1B) to provide a clear view of the pinion 106. As shown, the pinion 106 has a main body with teeth configured to engage with the teeth of the rack 142 as well as a collar immediately above the teeth. In some embodiments, the shaft 104 may be disposed to pass through a circular opening in the pinion 106. The shaft has a key (not pictured), which fits into a slot (not shown) in the pinion 106. The shaft 104 is encircled by a bearing 126. In some embodiments, the shaft 104 may be optionally encircled by additional bearings (such as bearing 136, for example, indicated to reside within the lower shaft housing 130).

FIG. 1B also more clearly shows one of the rollers 132, which is coupled to the lower shaft housing 130 in at least one embodiment. Also shown adjacent to the roller is a lower wear surface 134, which protrudes from the lower shaft housing 130. The lower wear surface 134 provides a stop against excessive vertical (in the coordinate system of FIG. 1B) displacement of the rack assembly 140 (and particularly rack 142) relative to the shaft assembly 110 (and particularly the pinion 106). In preferred embodiments, the wear surface 134 is either constructed from a material softer than that of the area of the channel 148 (which the wear surface is designed to contact) and/or is coated with such softer material. In some embodiments, this softer, referred to material is also judiciously chosen to reduce friction between the wear surface and the channel 148. Although depicted as a continuous portion of the lower shaft housing 130, the lower wear surface 134 may be configured as a separate object that couples to the rest of the lower shaft housing 130. It should be appreciated that the features of the wear surface 134 described above confer certain advantages, among which there are directing or redistributing a greater degree of operational wear to a part that is more easily accessed for service, and allowing an exhausted wear surface to be replaced (or recoated), thereby greatly extending the operational lifetime of the overall support mechanism.

FIG. 1B also shows an upper wear surface 124 on the upper shaft housing 120. Similarly to the situation with the lower wear surface 134, this wear surface 124 also serves as a mechanical stop against excessive vertical displacement of the rack assembly 140 relative to the shaft assembly 110. In preferred embodiments, the upper wear surface 124 is formed from a material chosen to reduce friction between the wear surface 124 and the channel 148 and softer than that of the roof 146 formed by the recess 144. Although depicted as a continuous portion of the upper shaft housing 120, the upper wear surface 124 may be configured as a separate object that couples to the rest of the upper shaft housing 120. It should be appreciated that the features of the upper wear surface 124 described above confer similar advantages to those discussed above in connection to the lower wear surface 134.

Figure 1C:
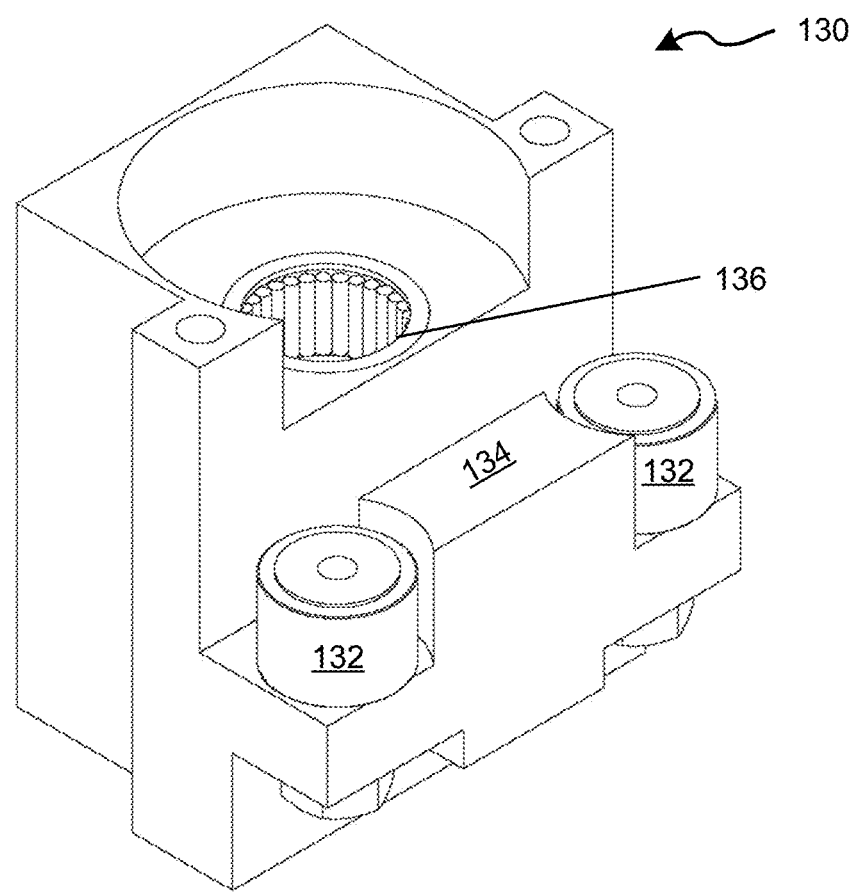
FIG. 1C is a detailed perspective view of selected elements shown in FIGS. 1A and 1B.

Additional details concerning the rollers 132, the wear surfaces 124 and 134, and the lower shaft housing 130 are visible in FIG. 1C that presents an isolated perspective view of the lower shaft housing 130. In particular, FIG. 1C clearly shows both rollers 132 positioned on either side of the lower wear surface 134, which extends or located at a level above the height of the rollers 132, ensuring that the rollers 132 do not contact the floor 148 of the rack assembly 140 during the operation of the system 100. The rollers 132 are pictured as conventional cam followers, but other devices or configuration are also suitable in a given embodiment.

Figure 2:
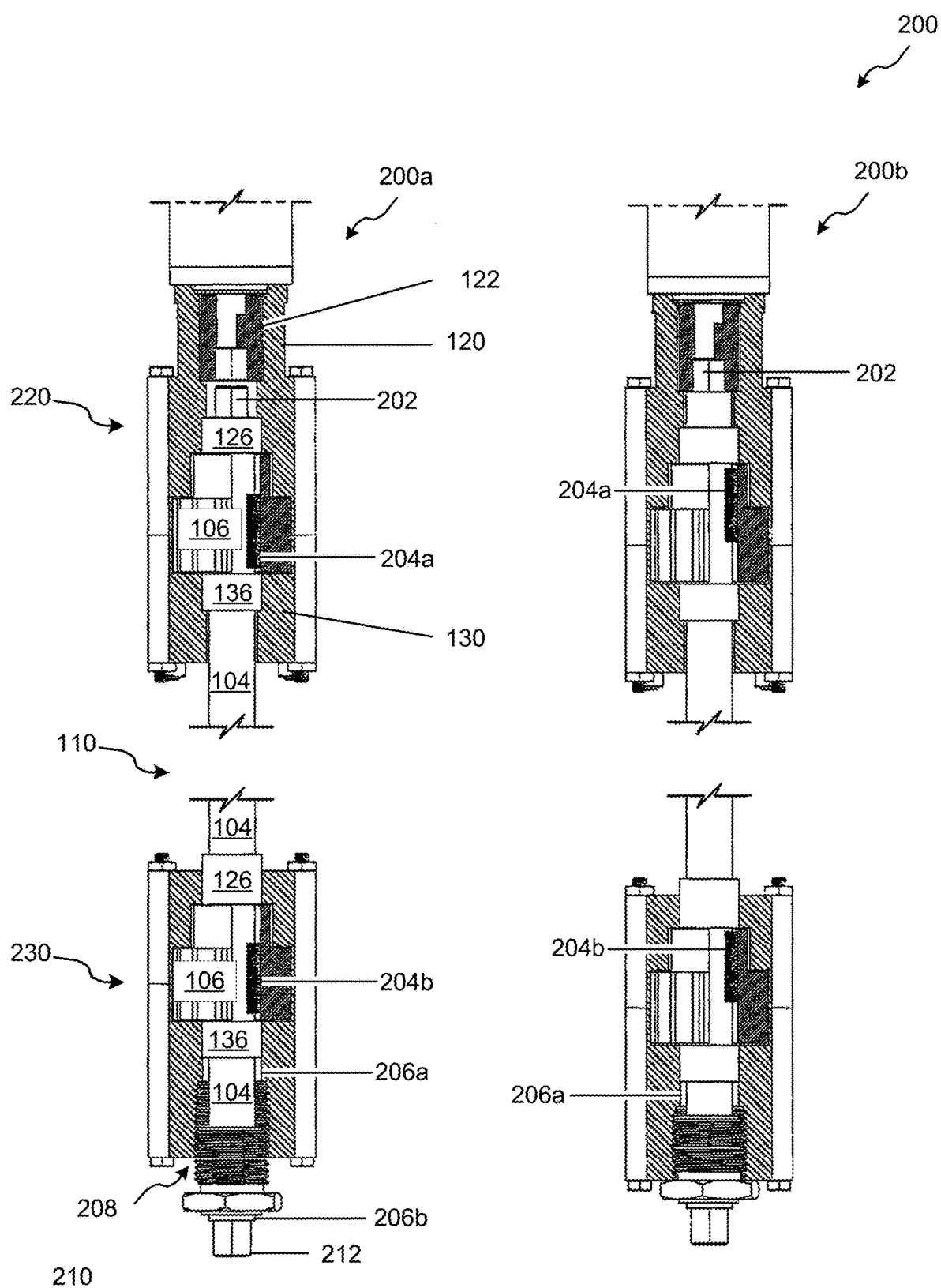
FIG. 2 is a cross-sectional view of an alternate embodiment in two different configurations.

Various embodiments comprise a shaft assembly 110 with a pair of pinions 108 and a corresponding pair of rack assemblies 140, each having a rack 142 and other elements described above. FIG. 2 shows one such embodiment 200 (only the shaft assembly 110 is shown). Embodiment 200 is shown in two different configurations, 200a and 200b. Together, these configurations illustrate a key feature of preferred embodiments: the ability to manually disengage the shaft 104 from the motor gearbox assembly 102 (not pictured in FIG. 2). For greater ease in understanding differences between the two configurations, only elements arranged differently between configuration 200a and 200b are labeled for configuration 200b. Although the components of shaft assembly 110 may be provided as discrete parts of sub-assemblies, portions of the foregoing discussion will describe shaft assembly 110 in a fully assembled state.

FIG. 2 illustrates an embodiment 200 (in which the shaft assembly 110 includes an upper pinion assembly 220 and a lower pinion assembly 230) in two configurations: 200a and 200b. The configuration 200a of the shaft assembly 110 is the initial configuration (as it may be during the assembly, when the shaft 104 is uncoupled from the motor coupling 122, but is retained within the shaft assembly 110). When the shaft assembly 110 is in configuration 200b, the shaft 104 coupled to the motor 102. Each pinion assembly is structurally similar to the pinion assembly 112 discussed in reference to FIGS. 1A and 1B. Each of the pinion assemblies 220, 230 includes a pinion 106 as well as an upper bearing 126 and a lower pinion bearing 136 through which the shaft 104 passes. These components are housed jointly within the upper shaft housing 120 and the lower shaft housing 130, which are coupled together. The shaft 104 is keyed in two locations, having an upper key 204a and a lower key 204b. These two keys (204a and 204b) fit into a recess (not shown) in each pinion 106, coupling the shaft 104 to each pinion 106 when the shaft 104 rotates. Additional detail of the pinions 106 and keys (204a, 204b) are discussed below, and are visible in greater detail in FIG. 3A.

The keys 204a and 204b are each made shorter than the overall length of the pinion 106, thereby allowing the shaft 104 to translate up and down along a direction parallel to the length of the shaft assembly 110. The shaft passes through a fastener 210 at the bottom of the shaft assembly 110. The fastener 210 both holds the shaft 104 in place and allows the vertical (in the coordinate system of FIG. 3A) position of the shaft 104 to be adjusted to engage the shaft 104 with the motor coupling 122 or disengage it from the motor coupling 122, as described below.

The shaft 104 is provided with two annular extensions 206a and 206a, one or more of which may be attached to the shaft after the shaft 104 is passed through the fastener 210 and the bearings (124, 134) within the two upper shaft housing 120 and lower shaft housing 130. These annular extensions may be configured as known structures (such as split-rings or other suitable structures) and serve to widen the shaft 104 where the extensions are installed. In some embodiments, the shaft 104 may be provided with a recesses dimensioned to receive the annular extensions. As shown, in FIG. 2, the annular extension 206a is placed just above the point at which the shaft 104 begins to pass through the top side of the fastener 210. The second annular extension 204b is placed at the point where the shaft 104 exits the bottom of the fastener 210.

It will be appreciated that, when the shaft assembly 110 is initially in configuration 200a, the shaft 104 is uncoupled from the motor coupling 122, but is retained within the shaft assembly 110 by at least annular extension 206a pressing against the top of edge of the fastener 210. If and when the fastener 210 is inserted further into the aperture 208 in the bottom of the shaft assembly 110, the fastener 210 pushes against the annular extension 206a, thereby pushing the shaft 104 upwards toward the motor coupling 122.

When the fastener 210 is fully inserted into the aperture 208, the top end 202 of the shaft 104 is driven into the motor coupling 122, thereby coupling the shaft 104 to the motor 102 (not shown in FIG. 2). As depicted, the top end 202 of the shaft 104 resembles a hex bolt and is configured to mate with a correspondingly-shaped opening in the motor coupling 122. The fastener 210 may be a suitable structure such as a pin or bolt with a channel dimensioned to receive the shaft 104. In certain embodiments, the aperture 208 may be threaded and the fastener 210 may be configured with complementary threads. In these and other embodiments, the fastener 210 may be configured to have a hexagonal cap, thus enabling the fastener 210 to be inserted and withdrawn using standard tools such as a wrench or crank.

When the shaft assembly 110 is in configuration 200*b*, with the fastener 210 fully inserted into the aperture 208 and the shaft 104 coupled to the motor gearbox assembly 102, the shaft 104 may be disengaged from the motor gearbox assembly 102 by withdrawing by partially fastener 210 from the aperture 208. When the fastener 210 is withdrawn from the aperture 208, the top edge of the fastener 210 pushes downward against the annular extension 206*b*, thereby withdrawing the shaft 104 from the motor coupling 122, as indicated by the position of the top end 202 of the shaft 104 in configuration 200*a*. While the process of withdrawing the shaft 104 might allow the shaft to fall out of the motor coupling 122 under the influence of gravity, the presence of the annular extension 206*b* provides additional downward force to ensure that the shaft 104 disengages despite possible friction due to thermal expansion or slight flexion of the shaft 104 (which might otherwise prevent the shaft 104 from disengaging easily).

Importantly, the keys 204*a* and 204*b* of the shaft 104 remain coupled to the pinions 106 in both configurations 200*a* and 200*b*. This coupling enables that the shaft assembly 110 (and particularly the pinions 106) to remain engaged with the rack assembly 140 corresponding to each pinion 106 and enables the rack assemblies 140 to move freely when they are pushed or pulled upon while the shaft 104 is disengaged from the motor assembly 102. Notably, even in configuration 200*a*, the shaft assembly 110 remains fully assembled. In the event of a motor failure, a user of the sliding support mechanism needs only to loosen the fastener 210 to restore (manual) functioning of the mechanism.

In certain embodiments, one or more of the keys 204*a* and 204*b* are configured to prevent each fastener 210 (and thus the shaft 104) from being completely removed from the aperture 208 when the shaft assembly 110 is fully assembled. In other embodiments, each fastener 210 may be provided with a visual indicator (such as a colored area, a line, or other marking) indicating how far the fastener 210 (and therefore the shaft 104) may be safely withdrawn.

Figure 3:
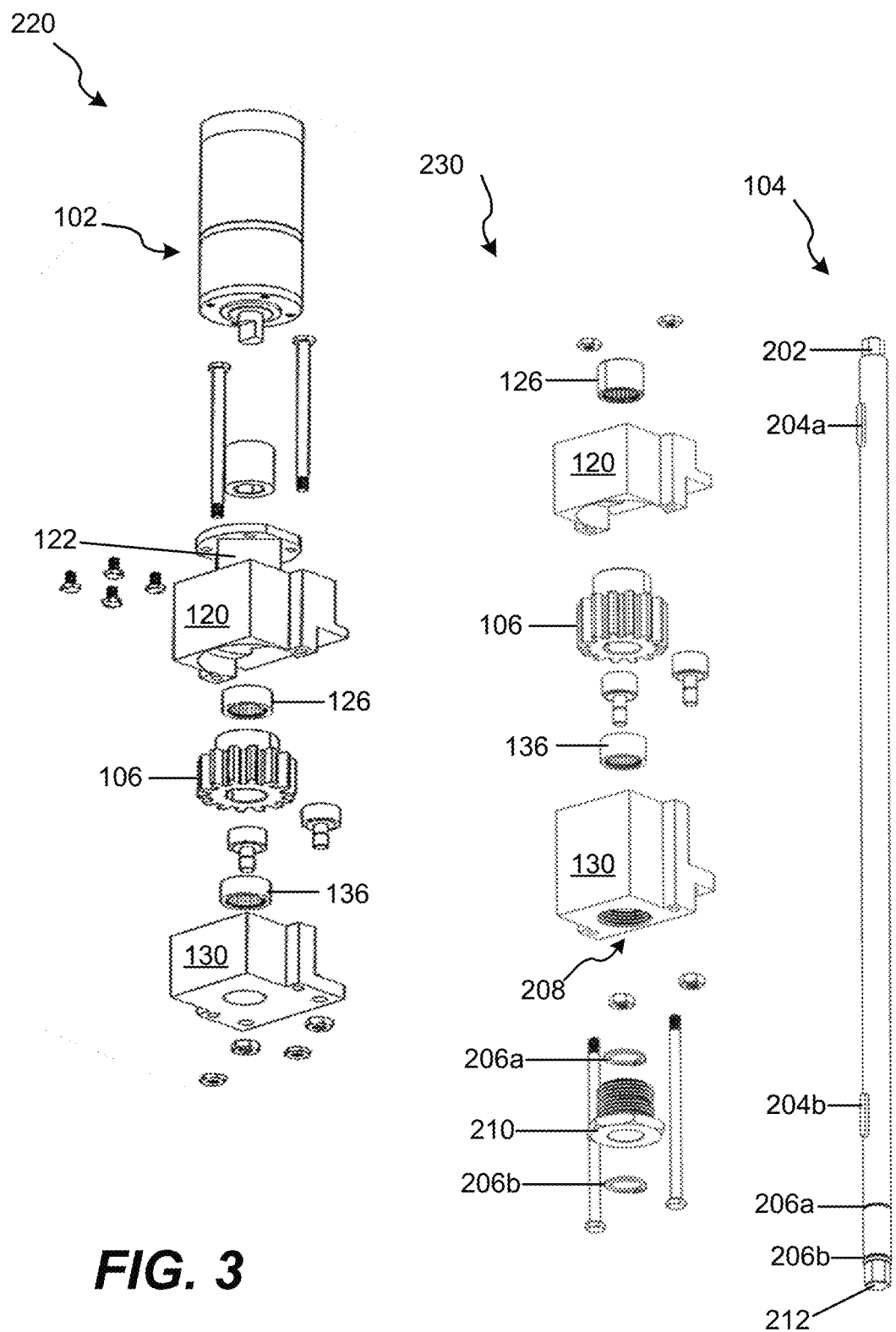
FIG. 3 presents exploded perspective views of selected elements and/or components of an embodiment of the sliding support mechanism shown in FIG. 1A and FIG. 2.

FIG. 3 presents exploded views of an example of the upper pinion assembly 220, an example of the lower pinion assembly 230, and an example of the shaft 104. Ancillary components such as screws may be shown, but not labeled. The upper pinion assembly 220 is shown with its corresponding upper shaft housing 120 and lower shaft housing 130, along with its pinion 106, upper bearing 126, and lower bearing 136. The motor coupling 122 is shown attached to the upper shaft housing 120 belonging to the upper pinion assembly 220.

Similarly, the lower pinion assembly 230 is shown with its corresponding upper shaft housing 120 and lower shaft housing 130, along with its pinion 106, upper bearing 126, and lower bearing 136. Although in this Figure the shaft housings that belong to the lower pinion assembly 230 are labeled identically to those for the upper pinion assembly 220, they structurally differ as previously discussed. In particular, the lower shaft housing 130 of lower pinion assembly 230 is dimensioned to contain the aperture 208, which is configured to receive the fastener 210, as previously described. Also shown are the annular extensions 206*a*, and 206*b*.

Also pictured in FIG. 3 is the shaft 104, with its top end 202 and bottom end 212. The keys 204*a* and 204*b* are shown on the surface of the shaft 104, and the locations of the annular extensions 206*a* and 206*b* are indicated (as previously described in reference to the lower pinion assembly 230).

During the operation of the system, or when the supported object is deployed, the racks 142 and pinions 106 may be subject to forces that will tend to cause misalignment leading to poor gear mesh, which in turn can result in structural damage and malfunctions. Accordingly, all elements of the mechanism are judiciously designed and structured to accommodate realistic amounts of displacement. For instance, each rack 142 is made deeper than the teeth of each pinion 106 are long, allowing each pinion 106 to remain fully engaged even if such pinion is displaced away from the corresponding rack 142. Similarly, the vertical extent of the rack is larger than the vertical extent of the teeth of the pinions 106, allowing the shaft 104 and pinions 106 to move up and down within an acceptable range while the pinions 106 remain fully engaged with each rack 142.

In further reference to the configuration of the housing of the motor gearbox assembly 102, currently accepted and produced industrially, such housing may be substantially cylindrical both at the portion of the motor gearbox assembly 102. Further details of the discussed constructions are shown in FIG. 4.

Figure 4:
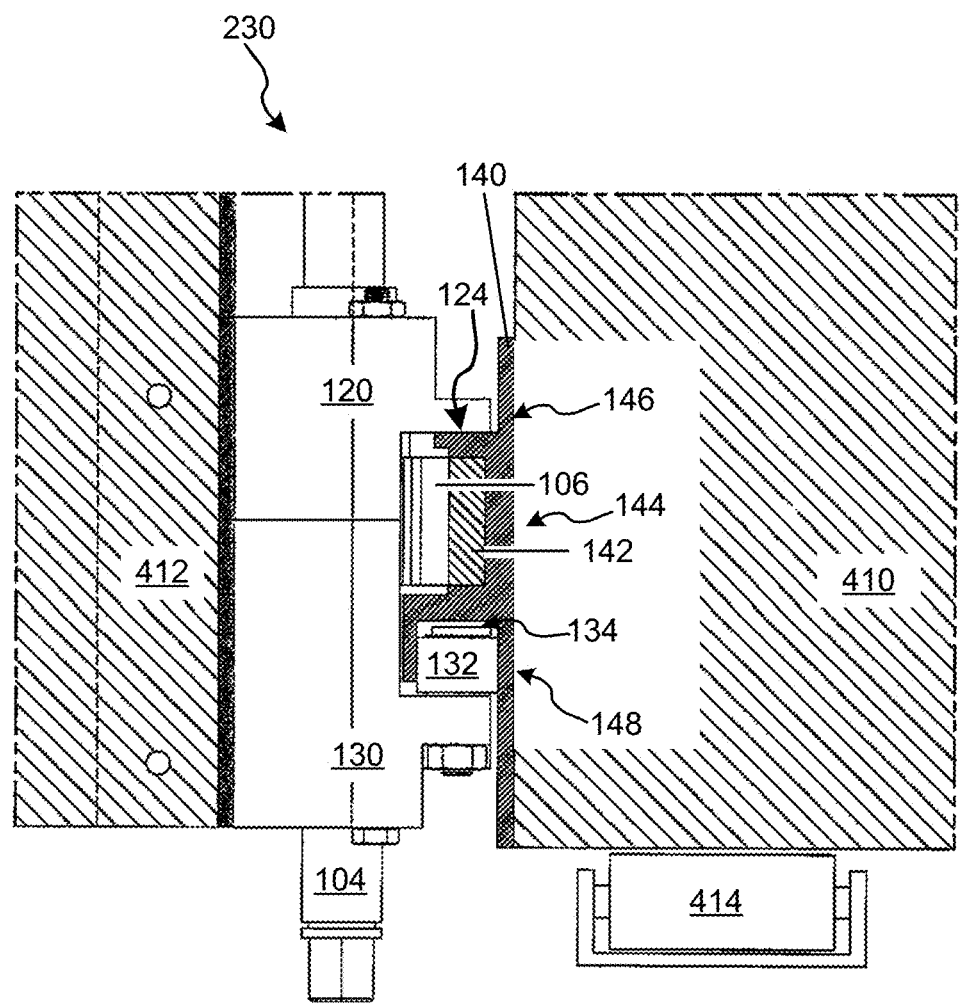
FIG. 4 is a cross-sectional view of another alternate embodiment.

FIG. 4 is a cross-sectional view illustrating elements of some embodiments presented above. FIG. 4 depicts a portion of the sliding support mechanism 100. This example shows a lower pinion assembly 230 engaged with a rack assembly 140. In this example, the shaft assembly 110 (represented by only the lower pinion assembly 230) is attached to shaft assembly mount 412 allowing it to be integrated into a larger structure (not shown). The rack assembly 140 is shown coupled to a frame 410 of an object (not shown) to be supported. The object (not shown) is also partially supported from below by a roller or conveyor 414. This example illustrates an application in which the mechanism 100 may be subject to external forces. For instance if the shaft assembly 110 is rigidly coupled to a larger structure using the shaft assembly mount 412, and the frame 410 of object being supported is not perfectly flat, the mechanism 100 will be subject to varying vertical displacements as the object slides in and out. These and other displacements are managed as described above in connection to FIG. 1B.

Some preferred embodiments include two pairs of mutually parallel rack assemblies 140, each pair disposed on one side of an object. For example, the object being supported may be an RV slide-out with one pair of racks on each sidewall. In this example, shaft assemblies would be fixed to the sidewalls of the RV (either within recessed compartments or protruding from the exterior walls). An example application of one such embodiment is shown in FIG. 5.

Figure 5:
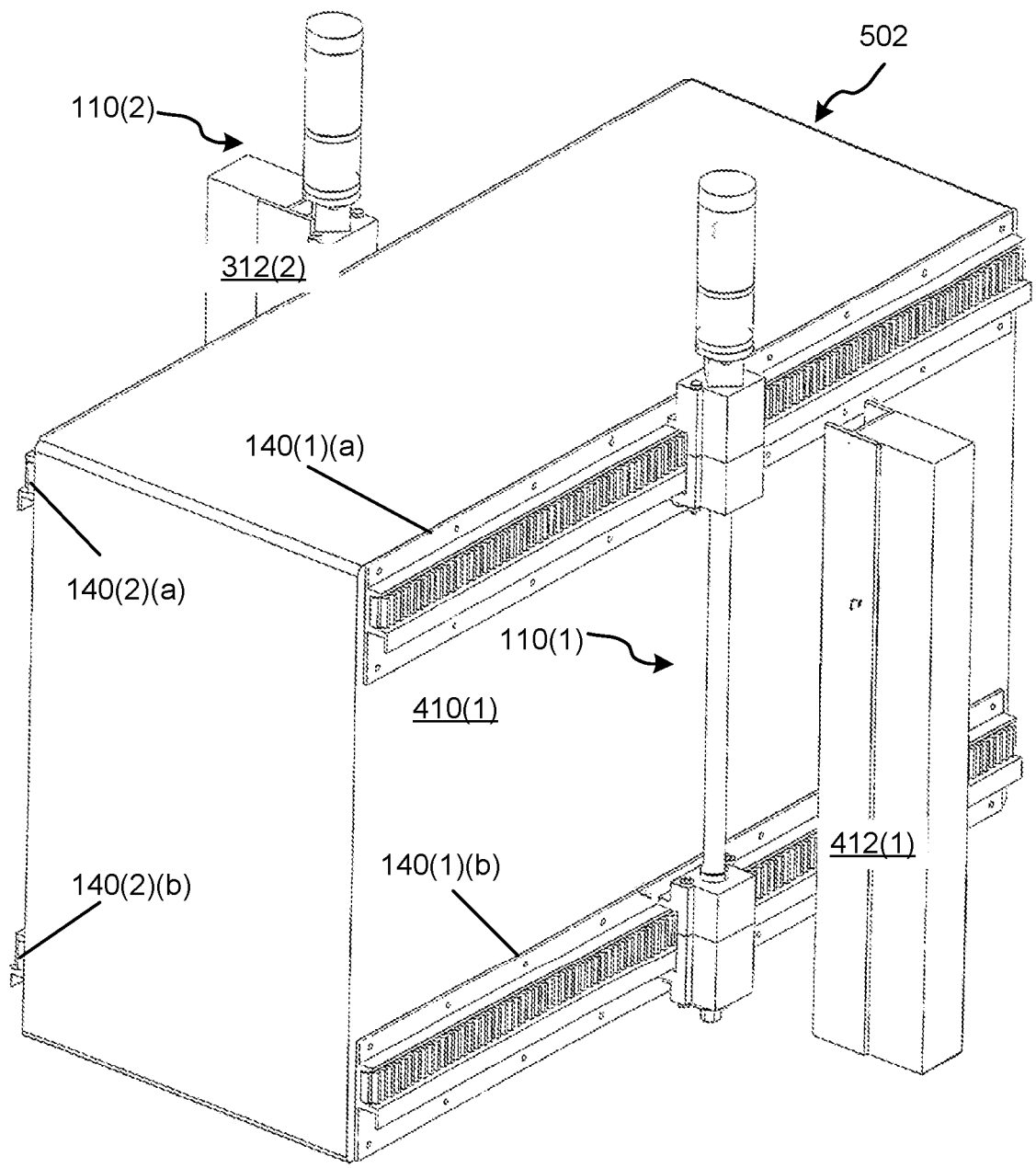
FIG. 5 is perspective view of an example of application of the alternative embodiment.

In the example of FIG. 5, the frame 410 belongs to an RV slide-out 502. The slide-out 502 has a frame 410 on two sides, labeled 410(1) and 410(2) for clarity. Each frame 410 is supported by a corresponding shaft assembly 110, labeled 110(1) and 110(2), respectively coupled to a pair of rack assemblies 140. The individual corresponding rack assemblies are labeled 140(1)(*a*) and 140(1)(*b*) on the right side, and 140(2)(*a*) and 140(2)(*b*) on the left side. Each shaft assembly 110 is configured to couple to the corresponding shaft assembly support 412, labeled 412(1) and 412(2). Each shaft assembly support 412 is shown as a mount configured to couple to the corresponding shaft assembly 110 and further configured to be installed within the walls of an RV (not shown).

Operational Environment: The Use of Embodiments in RV Slide-Outs

To further explain the benefits provided by embodiments of the present invention, aspects of embodiments suited to applications in RVs will be now be discussed in detail. Such embodiments include support mechanisms and motor assemblies used in these support mechanisms, as well as methods for integrating and employing such support mechanisms and motor assemblies within RVs.

As discussed briefly above, RVs frequently make use of slide-outs to increase available living space. For instance, a bedroom slide-out might increase the size of a bedroom area by extending outward from the walls of the RV. Typically, these slide outs are supported from below (under the floor of the module) by a roller or conveyor-type structure. In the conventional slide-outs discussed above, the slide-out will have racks mounted to each of two sides which are perpendicular to the outer walls of the RV. These racks engage with a shaft coupled to motor which drives the slide-out in and out. Because of the dimensions and weight of such slide-outs, there will be a dedicated motor for each of the two perpendicular side walls.

It should be understood that these slide-outs may not be entirely rigid. For instance, the floors may bend, flex, and warp over time. In addition, uneven distribution of weight within the slide-out module due to furniture of the presence of people inside them may also cause non-uniform displacement in the floors. Such unevenness will often lead to one side of the slide-out being displaced upward or downward with respect to the opposite side. In addition, as the slide-out is deployed, it is cantilevered over the ground. Since only the portion of the slide in contact with the walls or floor of the RV is supported, the racks on both sides will experience a torque which will tend to rotate the slide-out with respect to the racks. In addition, if the racks are driven by a rotor and shaft, the racks will experience a back-torque that will tend toward twisting the slideout relative to the walls of the RV. If a slideout support is not properly designed, all these forces can lead displacement and flexure of various components of the support mechanism leading to poor gear mesh between the racks and the respective shafts used to drive the racks. Poor gear mesh can ultimately lead to excessively worn gear teeth and eventual failure of the mechanism.

Because such mechanisms rely on motors with very high gear reductions (due to need for the motors to fit unobtrusively with the walls of an RV), it can be extremely difficult or impossible to manually deploy or stow and RV slide-out if one or more motor fails. As a result, it is important to provide a means of decoupling the racks from the motors to allow the shafts to turn.

With these concerns in mind, deficiencies of related art RV slideout supports become evident. An example related art slide-out mechanism used in thousands of RVs or more every year uses a splined shaft rather than distinct pinions coupled to a bearing-mounted shaft as disclosed herein. The example related art mechanism does not connect the motor/brake solidly to the upper pinion housing in order to provide a means for separating the motor/brake from the pinion gears (the splines) which are meshed with linear gear racks mounted to the sides of the slide-out. Separating the motor/brake from the splined shaft pinion gear assembly is required to be able to manually push the slide-out back in for travel should a drive failure occur.

This example, mechanism of related art replaces the motor/brake threaded holes intended to bolt the drive motor/brake to a drive housing, with four set screws loosely fitting in holes in the housing. An external screw, threaded through the wall channel and into a cooling slot in the motor/brake, keeps the motor engaged with the splined shaft assembly. This attachment design enables removing the external screw and prying the motor/brake up manually, disconnecting it from the splined shaft assembly. This enables pushing the slide-out in manually from outside the RV.

By contrast, the disclosed embodiments allow for bolting the motor assembly 102 solidly to the upper pinion housing 220 and provides a secondary means for disconnecting the motor from the pinions 106, as previously discussed.

An additional advantage is realized by allowing the pinion housings (220, 230) to float up and down with the slide-out since the motor is not anchored to the outside wall. This is important since up and down movement of the slide-out occurs when the slide-out (represented schematically by object 410 of FIG. 4), rolling on rollers beneath (represented schematically by rollers 414 in FIG. 4) does not move perfectly in plane with the pinion housing assembly fastened to the outside wall (represented schematically by shaft assembly mount 412 in FIG. 4). In embodiments disclosed herein, the pinion housings (such as the pinion housings 220 and 230 shown in FIG. 2) are floated up and down by surfaces (e.g., upper wear surface 124 and lower wear surface 134) on the pinion housings (220, 230) that ride against surfaces on each rack assembly 140 to the side of the slide-out. This movement is allowed and guided with proper slide bearing surfaces.

Another advantage of embodiments disclosed herein is the way gear pitch circle alignment is maintained between the pinions 106 and the racks 142. This is accomplished in certain embodiments by providing cam follower type bearings (as bearings 132) in the pinion housings that run inside the U-shaped channel 148 contained in the rack assembly 140. These cam follower type bearings in the pinion housing are fore and aft of each pinion 106 and prevent each pinion from being pushed in or out relative to the corresponding rack 142.

The loose fit of the pinion housings 220 and 230 with the wall mounting channel (see 412(1) in FIG. 5) allow in and out and up and down movement as described earlier. In and out movement translates to side to side movement of the slide-out. Allowing for this is important since the slide which is rolling on rollers beneath it may be steered left or right as the slide-out is retracted or extended. If the slide-out is steered to press one bearing housing of the bearings 132 into the channel 148 causing it to bottom out in the channel 148, gear alignment is still maintained by the bearings 132 in the pinion housing (i.e., 220 or 230) pushing against the rack assembly 140 and forcing the slide-out to be pushed away. Similarly, on the opposite side of the slide-out, the bearings 132 on the opposite side pull the pinion housing (220 or 230) out of the channel 148 while still maintaining proper gear mesh. Secondarily, the force of the drive motor acting between the pinions 106 and the racks 142 produces a twisting force on the pinion housings (220, 230). This twisting is partially reacted against by the housing trying to turn in the wall channel but is also satisfactorily reacted by having fore and aft bearings 132 reacting against this twisting force.

Yet another advantage of certain embodiments of the proposed sliding support mechanisms is the use of replaceable low friction bearings for the bearings 126 and 136 in the housings (220, 230) that the shaft 104 turns in. The reaction of the gear force is carried in these bearings. Lowering this bearing friction increases the force available to drive the slide-out.

As mentioned embodiments herein provides a means of disconnecting shaft 104 from the motor assembly 102 to allow manual retraction of the slide. The motor assembly 102 is connected to the shaft 104 using a standard fitted coupling (represented as motor coupling 122). The motor shaft extension is round with a flat surface that mates with an internal flat surface in the coupling and the end of the shaft 104 is machined to a hexagon shape to mate with the internal hex of the coupling (see FIG. 2, for example). To disconnect the motor assembly 102 from the shaft 104 the shaft 104 is simply withdrawn from the motor coupling 122. The coupling 122 is prevented from disengaging from the motor assembly 102. Drawing the shaft out of the motor coupling 122 causes disengagement of the shaft 104 and free movement of the slide-out. The upper and lower pinions 106 stay engaged with the shaft 104 because the internal keyways in the pinions 106 (see keys 204a and 204b and their positions within the pinions 106 in FIG. 2) are long enough to stay engaged when the shaft 104 is pulled out of the motor coupling 122. The end 212 of the shaft 104 (see FIG. 2) opposite the coupling end 202 is extended and machined for wrench flats to be able move the slide with a wrench when shaft 104 is disengaged.

Figure 7A:
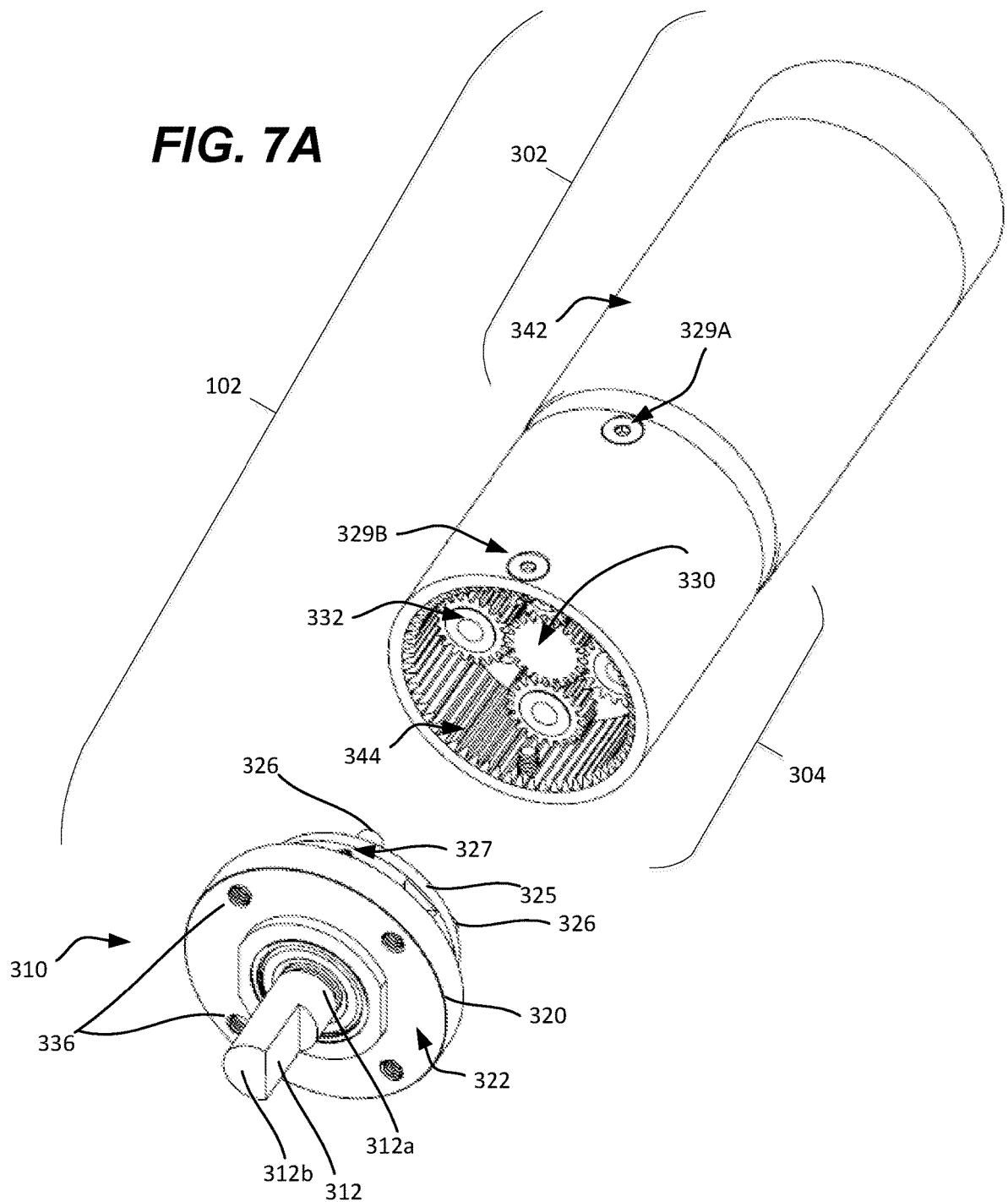
FIGS. 7A, 7B, and 7C present various views of portions of a conventionally-structured motor assembly forming a part of the embodiment of FIGS. 1A, 3A.

It is the very practical use of the sliding support mechanism of the invention in the RV-environment that raises the question of unreliability of the industrially-produced motor assemblies 102 and presents a cause for defining a solution to improving the quality of such motor assemblies. To understand the situation better, the following description first presents the structural characteristics of the conventionally-configured motor assemblies 102. To this end:

FIG. 7A illustrates schematically an embodiment of the motor assembly 102, partially exploded to show a motor portion 302 (which contains the motor housing with the motor inside—not shown; and the set of gears or gear train 332) and a rotor portion or assembly 310. The rotor assembly is additionally detailed in FIGS. 7B and 7C, illustrating, respectively, a cut-out perspective view and a side view of the assembly 310.

Figure 7B:
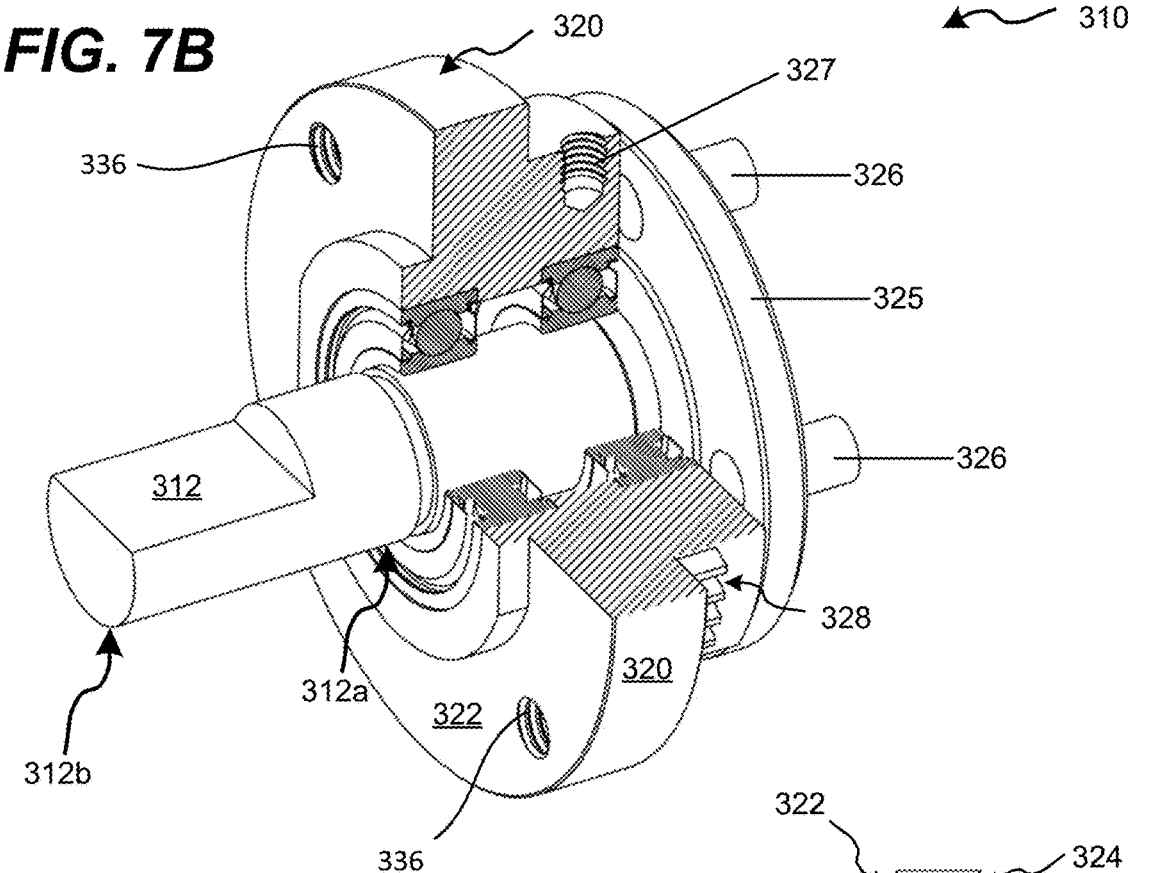
Figure 7C:
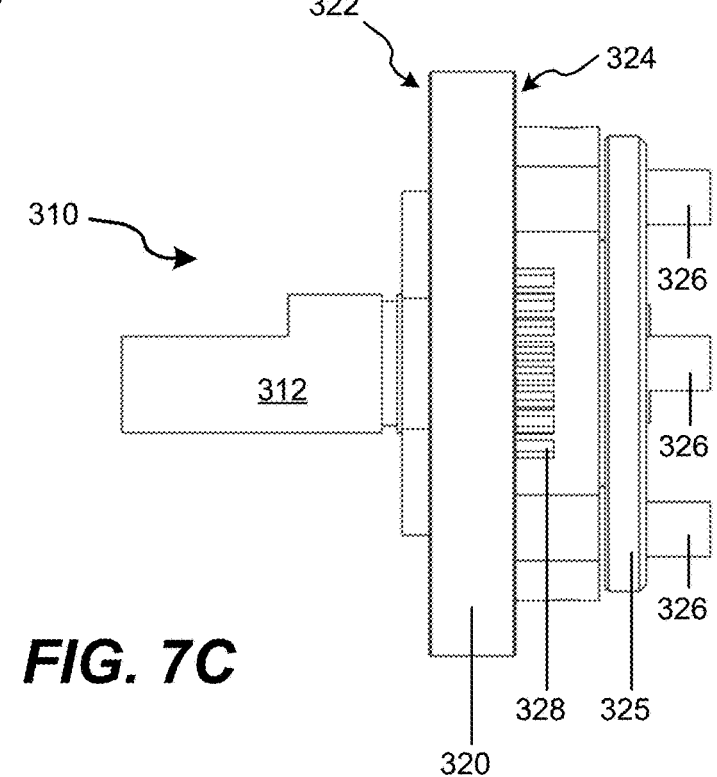

Referring now to FIGS. 7A, 7B, and 7C, illustrating a conventional structure of the motor assembly, used in related art: the motor gearbox assembly 102 contains a drive motor portion 302 (or, simply, drive motor, shown concealed in the typically-cylindrical motor housing), a planetary gearbox 304, and the rotor assembly portion 310.

The rotor assembly portion 310 is structured to include a bearing held in a respective housing, a rotor or shaft 312, and a faceplate or bearing housing 320, which has an outer face 322 and an inner face 324 and through which the rotor/shaft 312 (engaged with the faceplate 320 via the bearing) passes. The rotor 312 has a proximal end 312a and a distal end 312b. The rotor assembly 310 also includes a gear plate 325, that is coupled to the faceplate or bearing housing 320 (that encloses the bearing mechanism shown in FIG. 7B, that carries the threaded mounting holes 336).

The drive motor 302 contains an output motor shaft (not shown) with a gear fitted to the end of the shaft and caused to turn with the motor itself. The planetary gearbox 304 contains a set of multi-stage planetary gear 332 (arranged around a central gear 330), which in a typical embodiment of the motor assembly 102 is coupled to the motor of the drive-motor portion 302 and further to the rotor assembly 310 or portion 310, to transfer (in operation of the motor assembly) the motion and associated torque from the motor to the rotor/shaft 312.

As shown, the housing of the drive motor 302 has an outer surface 342, while the housing of the planetary gearbox 304 includes an inner surface 344, which may be structured to contain a relief structure. The surface 344 is provided with teeth designed to engage or mesh with the outside of the set of gears 332. The (typically cylindrical) housing of the planetary gearbox 304 is rigidly joined to the housing of the drive motor 302 by a fastener (shown as 329A), while the housing of the gearbox 304 is rigidly joined to the bearing housing of the rotor portion 310 with the fastener 329B (and thread or sets of threads 327).

The rotor assembly 310 may also include one or more sets of teeth 328 (not shown in FIG. 7A but visible in FIGS. 7B and 7C) disposed on an edge near the inner face 324 of the faceplate 320. The teeth 328 are configured such as to engage with the relief structure of the inner surface 344 when the leading end of the rotor assembly, which faces the gears 332 in FIG. 7A, is inserted into and coupled to the housing of the gearbox 304. After this is accomplished, the screw 329B is threaded through the corresponding opening in the housing of the gearbox 304 to secure the portion 310 in its cooperation with the portion 304.

Notably, once the motor assembly 102 has been brought together and assembled (by affixing to one another the drive motor portion 302, the gearbox 304, and the rotor portion 210), the overall motor assembly is further cooperated with to be coupled to upper shaft housing 120 (at the motor coupling 122, for example, as shown in FIGS. 1A, 3A) using fasteners such as screws or bolts and the correspondingly threaded openings 336 in the face plate 320.

In operation, rotation of the drive motor output gear causes the planetary gear 332 to turn inside the housing of the gearbox 304. (Here, the stages of the gear in the multi-stage gear set 332 pass on the motion at a reduced speed and increased torque from stage to stage. For example, the second stage of planetary gearing contains the same mechanisms as the first stage, except the motor output gear is replaced with a gear similar to the central gear 330. Subsequent stages duplicate the second stage up to the output stage. The output stage replaces the gear 330 with the rotor/shaft 312 and transmits the power out through the end 312b.) The intent of this design is that motor 302, the gear housing 304, and bearing housing 310 are locked together with screws 329A and 329B and the overall assembly 102 is installed with attachment screws matching the threads in opening 336, thus creating rotation of the shaft 312 at low rpm and high torque.

The applications of the sliding mechanisms, utilizing the motor assembly(ies) 102 and aimed at repeatable repositioning of heavy loads over hundreds of thousands of times, required that the planetary gears of the gearbox 304 be appropriately designed to scale up the torque generated by the motor of the drive motor portion 302 up to the levels needed to rotate the rotor/shaft 312 of the assembly 310. In some embodiments, the torque transfer ratio from the motor to the shaft 312 may measure in hundreds. In other words, the ratio of the torque present at the rotor end 312 to intrinsic torque generated at the input of the gear set by the motor is at least 100, more often 300-500.

The use of such embodiments of motor assemblies in sliding support mechanisms of the invention leads to a bizarre situation when the connection between the housing of the gearbox 304 and the faceplate 320 of the rotor portion cannot withstand the high-level rotational torque transferred to the rotor end and "gives in" thereby making the motor assembly non-usable.

Phrased differently, industrial practice convincingly demonstrates that conventionally-structured motor assemblies 102 (described above and used in the sliding support mechanisms of the invention) often experience failure.

In particular, when such embodiments of the motor assembly 102 are used, the structural features such as the teeth 328 and at least the screw or fastener 329B (designed specifically to prevent the rotor assembly 310 from the rotational displacement with respect to the housing of the gearbox 304) s become substantially inadequate for this purpose and are, effectively, stripped away or worn out to the point that the coupling between the teeth 328 and the relief of the surface 344 ceases to exist. When such operational condition is reached, the motor assembly 102 becomes effectively inutile for extending and retracting the target slide-out sections and as part of the sliding support mechanism.

That is, the failure of the teeth 328-relief surface 344 and the fastener 329B (which are subject of high torque delivered by the multi-stage planetary gear of the gearbox 304 from the motor of the drive motor portion 302 to the shaft 312) result in a separation of the housing of the gearbox 304 from the installed in it bearing housing 322, rendering the assembly 102 unusable. (To enable the reader to visualize this more clearly, consider rigidly bolting the bearing housing 320 with fasteners in holes 336 to a fixture and forcefully restraining the output shaft while powering the drive motor. The torque path goes through fasteners 329A and 329B and is reacted at the mounting fasteners 336. Since the fastener 329B is much higher stressed than the other connections, it fails first. This is the mode of failure practically seen in operation of RV slide outs.)

Embodiments of the present invention address this practical problem by providing a means of mounting the motor assembly at the housing of the gearbox 304 (instead of at the bearing housing 320), thereby eliminating the torque connection between the gearbox 304 and the bearing housing 320 from which the conventional design of the motor assembly 102 suffers. The proposed rotation-prevention and motor-assembly-to-upper-shaft-housing-attachment arrangement, is structured to extend outside of the outer surface of the conventional industrially-produced housing of the motor assembly (that is, to be separated from the surface structure 344 by a wall of the motor housing) and to avoid the use of the face plate (or bearing housing) 320 when attaching the motor assembly 102 to the upper shaft housing 120. In particular, embodiments of the present invention are configured to modify the already-produced, off-the-shelf conventional motor assembly 102.

Figure 6A:
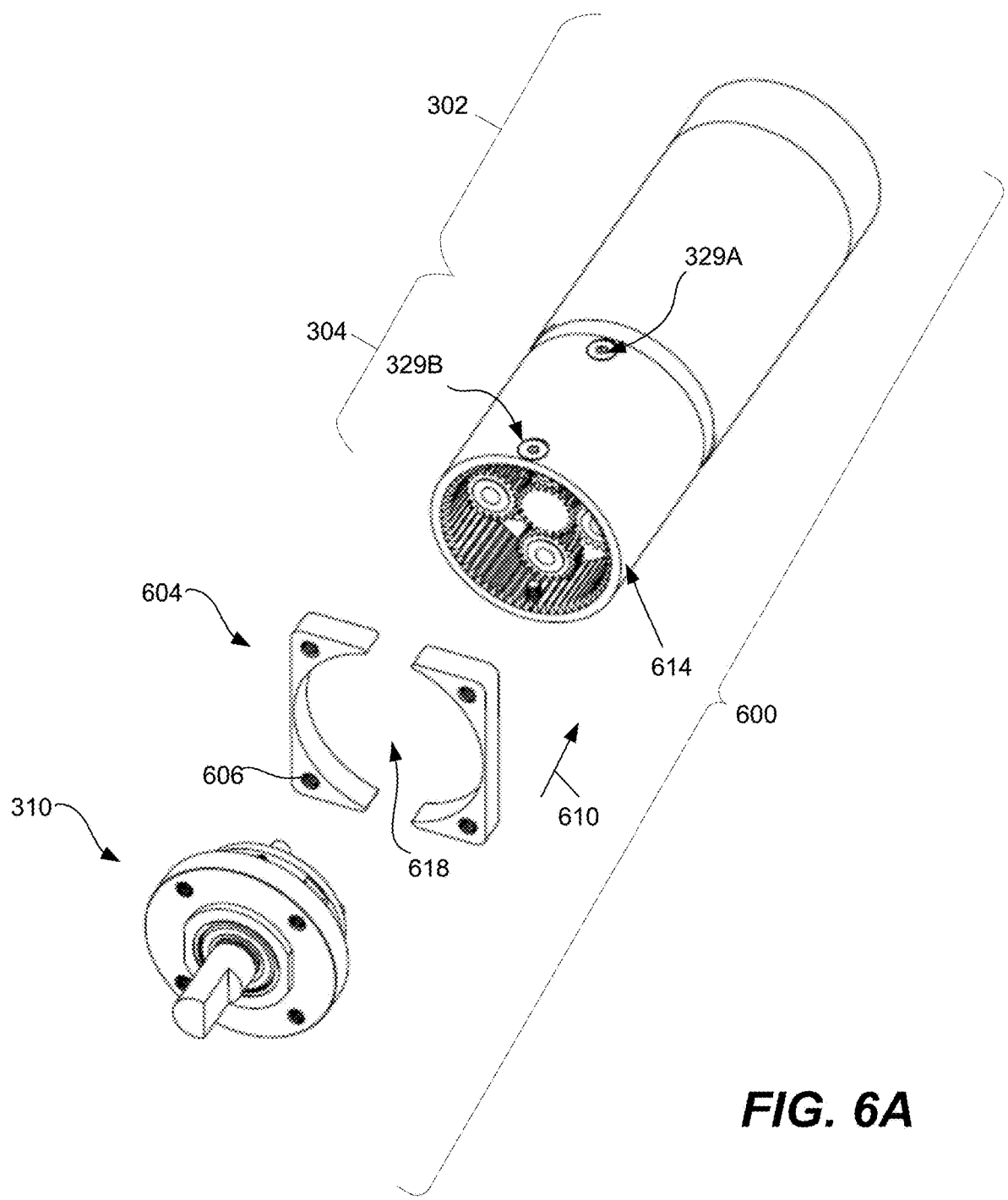
FIGS. 6A, 6B, and 6C present different views of portions of a modified motor assembly for use with the embodiment of FIGS. 1A, 3, 5.
Figure 6B:
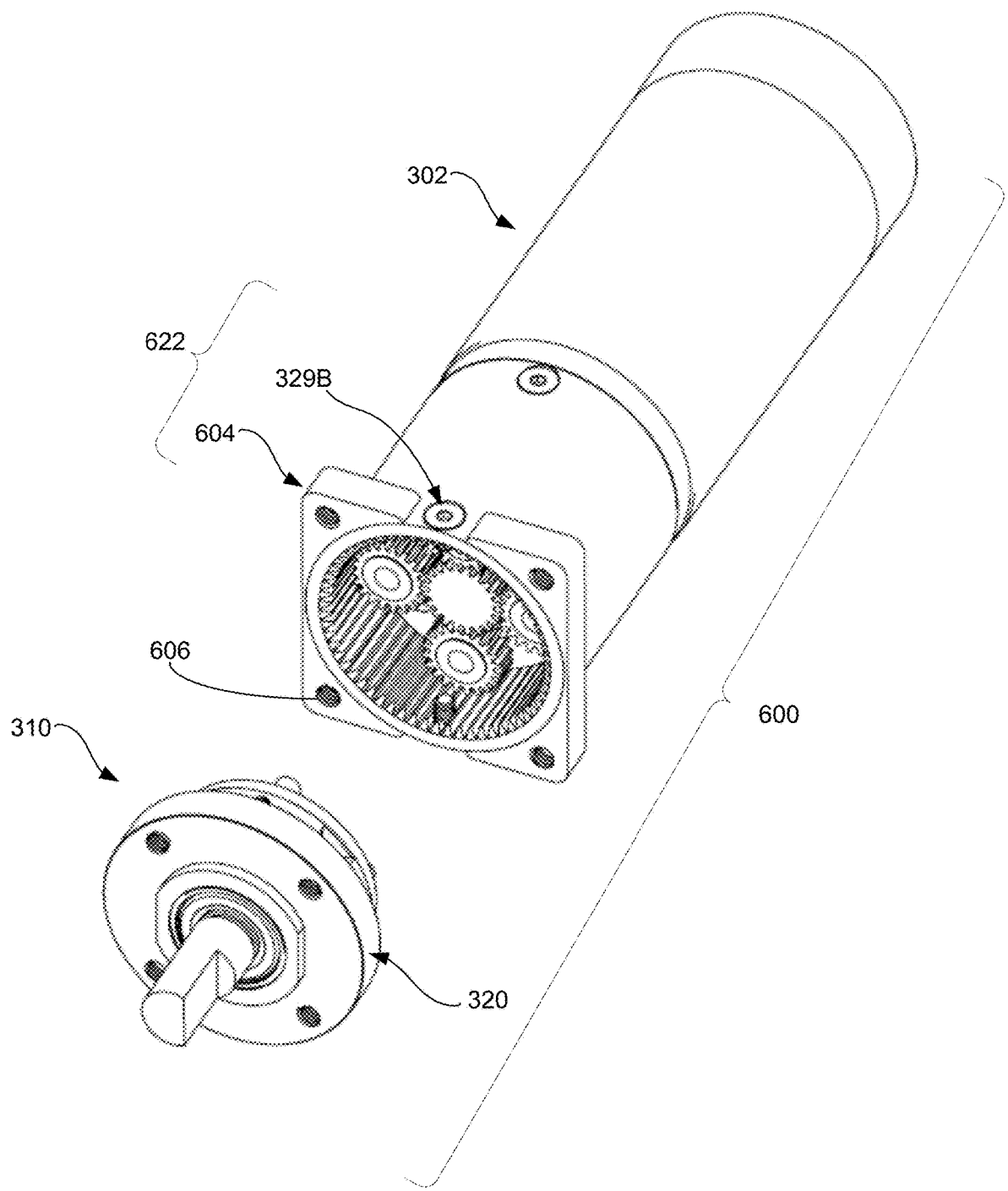
Figure 6C:
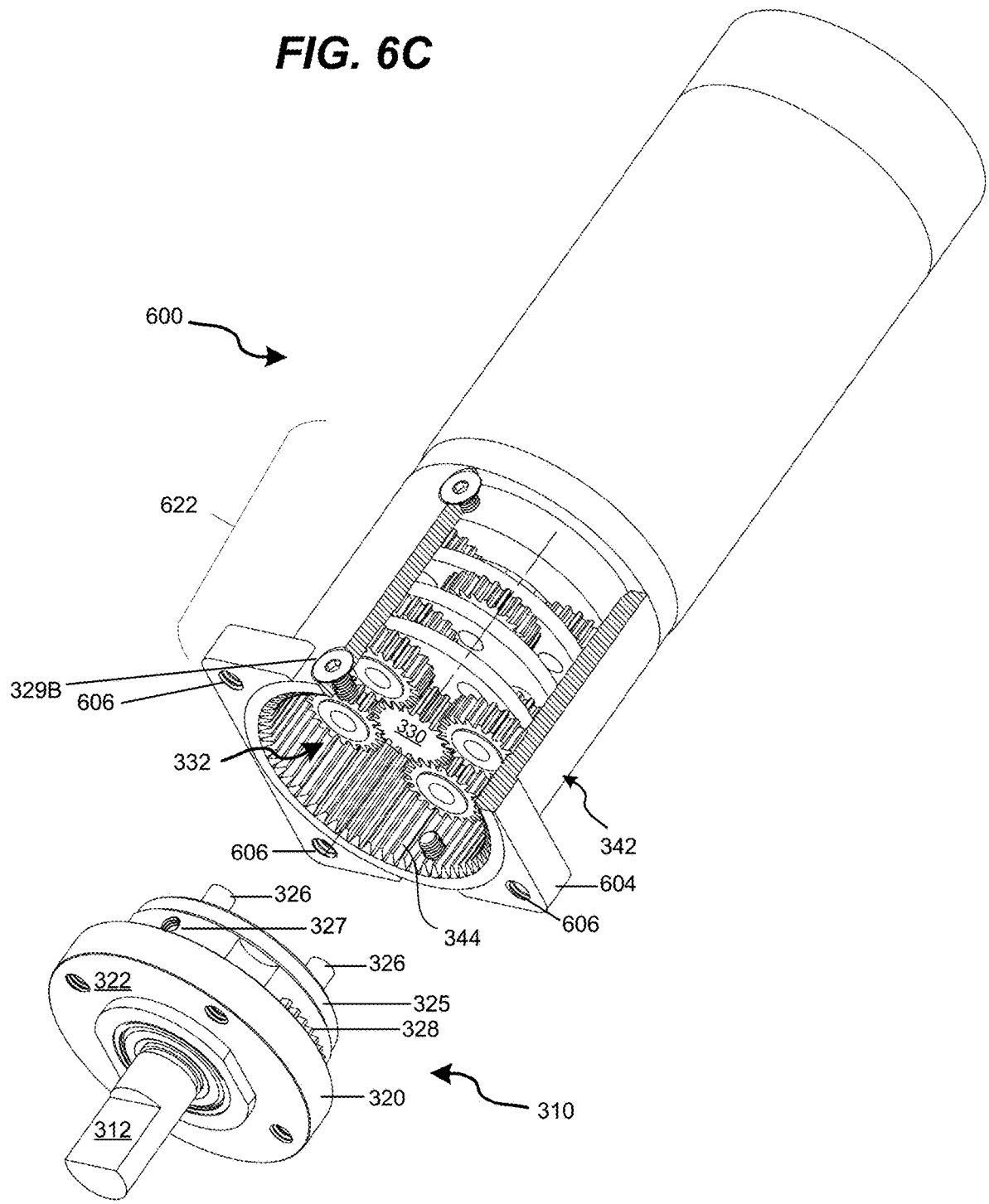

In reference to FIGS. 6A, 6B, and 6C, one non-limiting implementation 600 of the motor assembly specifically structured for use with an embodiment of the sliding support mechanism (FIGS. 1A, 3A, 5, for example) is discussed. A person of skill will immediately appreciate that operational advantage, provided by the structural differences between the embodiments 600 and 102, ensures that the exploitation of the sliding support mechanism that employs the assembly 600 remains intact for more than 3,100 cycles.

According to the idea of the invention and as shown in FIG. 6A, for example, the motor portion 302 of the conventional motor assembly 102 (and, specifically, the housing of the motor portion 102) is being judiciously modified by equipping the motor portion with an outside structural component. The chosen structure of the such outside component, in one implementation, is devised to spatially extend (in a radial direction as viewed from the axis of the motor component 302) beyond the limits of the housing and to provide for such a mechanism of connecting the motor portion 302 to the motor coupling 122 (of the embodiment of the sliding support mechanism of the invention, at the upper shaft housing 120, for example) that substitutes the conventionally-used connection between the face plate 325 and the upper shaft housing 120 discussed above.

As shown in the non-limiting example of FIGS. 6A, 6B, 6C, the housing of the conventionally-implemented gearbox 304 may be provided or complemented with a collar 604 (shown in Figures as a combination of two distinct components with polygonal perimeters, but more generally configured as a single component with an aperture dimensioned to tightly fit or accommodate the housing of the gearbox 304 in it). In practice, the conventional off-the-shelf motor assembly 102 is disassembled to separate the constituent portions 302+304, 310 from one another, and collar 604 is slided onto (as shown schematically with an arrow 610 in FIG. 6A) and attached to and outside of the housing of the gearbox 304 along its perimeter, at or near the edge 614 of the housing facing the rotor portion 310 (see FIG. 6B). To ensure the tight fit between the collar 606 and the housing of gearbox 304, the curvature of the opening 618 of the collar 606 is judiciously defined to be substantially matched to that of the outer surface of the housing in question. Regardless of whether the outer diameter of the faceplate or bearing housing 320 is substantially equal to or exceeds the outer diameter of the housing of gearbox 304 at this edge 614, the collar 604—once positioned at the edge 614—does not interfere with the plate 320. Once the collar 604 is appropriately cooperated with the gearbox 304 (and care is taken to keep the heads of the fasteners unobstructed), it is irremovably/permanently affixed to the housing of the gearbox by, for example, welding these two component to one another along an edge of the opening 618, to form a modified gearbox 622. (In one alternative, the housing of the gearbox 622 may be cast or machined with the collar 604 being an integral part of this housing.) The process of forming the modified motor assembly 600 is then completed by affixing the rotor portion 310 to the gear box 622 by sliding the leading portion of the portion 310 into the opening of the housing of the gearbox 622, meshing the teeth 328 with the surface relief 344, and affixing the housing of the gearbox 622 to the faceplate 320 with the use of the fastener 329 (in a fashion analogous to that of affixing the rotor portion 310 to the gearbox 304 of the embodiment 102, that was discussed above).

Notably, according to one implementation of the idea of the invention, the collar 604 may be equipped with openings 606, configured in a fashion similar to that of the openings 336 of the faceplate 320 of the conventionally-complemented motor assembly 102. If this is the case, the openings 606 are disposed at such radial distance from the axis of the gearbox 622 as to allow for mechanical coupling of the housing of the gearbox portion 622 to the upper shaft housing 120 (at the motor coupling 122, for example) using fasteners such as screws or bolts while, at the same time, by-passing the faceplate 320. Notably, as a result of such mechanical coupling, the faceplate or bearing housing 320 of the rotor assembly 310 is operationally decoupled from the amplified torque, transferred from the motor to the rotor/shaft 312 while, at the same time, maintaining its bearing function. The dimensions and construction of the collar 604 and its openings 606 may be chosen based on the torques the parts must withstand in order to prevent wear and failure of the coupling between the rotor assembly 310 and the motor housing 302 for particular motor and gear configurations.

Figure 6D:
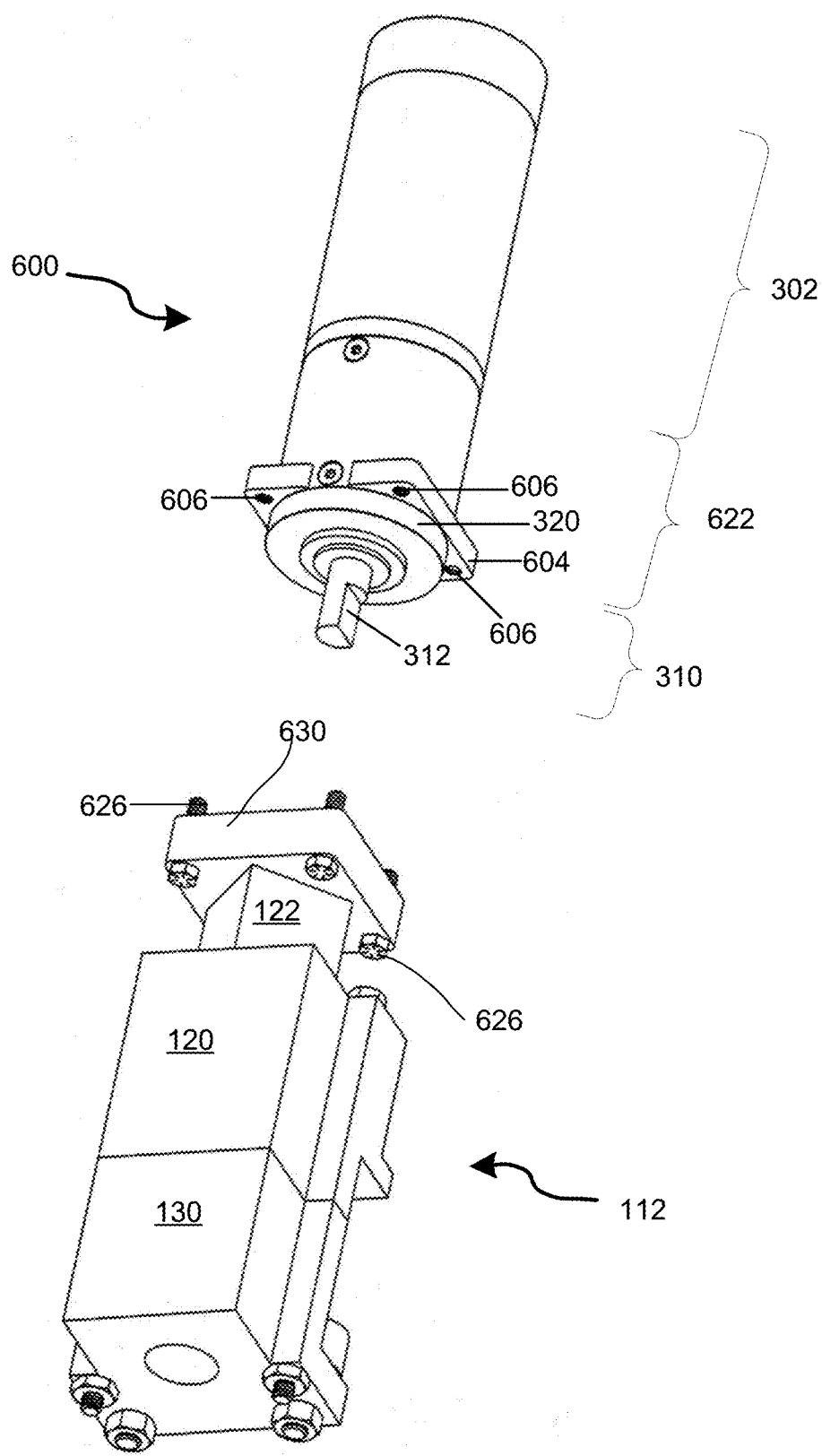
FIG. 6D: a perspective view of the embodiment of the modified motor assembly of the invention in spatial cooperation with a pinion assembly of the sliding support mechanism.

FIG. 6D complements the description of the embodiment of the invention by depicting the rotor assembly 310 resting in and affixed to the modified gearbox 622 622 and the pinion assembly 112 (counterpositioned with the motor assembly 600). The motor coupling portion 122 of the pinion assembly 112 is shown with fasteners 626 configured, in the plate 630, to reciprocate to and match the openings 606 of the collar 604 and configured to be threaded unto the openings 606 in to securely couple the housing of the motor portion 622 of the motor assembly 600 to the upper shaft assembly 120. A skilled person will unmistakably understand that, as a result of implementing this mechanical coupling, the joint formed between the rotor portion 310 and the modified gearbox 622 substantially is not exposed to the rotational torque produced by the motor of the assembly 600 and scaled up by a factor of at least 100× by the gears 332 of the gearbox 622. Instead, this torque—as far as its influence on the housing of the embodiment is concerned—is applied to the combination of the collar 604 and the plate 630, by-passing the combination of the surface relief 344 of the inner surface of the housing of the motor portion 622 meshed with the teeth 328 of the rotor portion 310.

It should be understood that, although features described in connection with FIGS. 6A-6C are described in the context of example motor assemblies, that some or all of the described features may be implemented in assemblies which do not require any particular motor assembly shown in the Figures or otherwise described herein.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes. In some specific cases, which are within the scope of the invention, the terms "approximately" and "about", when used in reference to a numerical value, represent a range of plus or minus 20% with respect to the specified value, more preferably plus or minus 10%, even more preferably plus or minus 5%, most preferably plus or minus 2% with respect to the specified value.

References made throughout this specification to "one embodiment," "an embodiment," "a related embodiment," or similar language mean that a particular feature, structure, or characteristic described in connection with the referred to "embodiment" is included in at least one embodiment of the present invention. Thus, appearances of these phrases and terms may, but do not necessarily, refer to the same implementation. It is to be understood that no portion of disclosure, taken on its own and in possible connection with a figure, is intended to provide a complete description of all features of the invention.

It is also to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed.

The invention as recited in claims appended to this disclosure is intended to be assessed in light of the disclosure as a whole, including features disclosed in prior art to which reference is made.

While the invention is described through the above-described exemplary embodiments, it will be understood by those of ordinary skill in the art that modifications to, and variations of, the illustrated embodiments may be made without departing from the inventive concepts disclosed herein. Disclosed aspects, or portions of these aspects, may be combined in ways not listed above. Accordingly, the invention should not be viewed as being limited to the disclosed embodiment(s).

What is claimed is:

1. A sliding support mechanism having a main axis, the mechanism comprising:
   a motor assembly having a drive motor and a gearbox enclosed in a first housing unit, and a rotor portion dimensioned to be partially inserted in said first housing unit when the motor assembly is complete, the rotor portion containing a rotor bearing housing and a rotor passing therethrough,
   wherein the first housing unit includes a structural extension element that protrudes radially with respect to the main axis and beyond a radial extent of the rotor portion, said structural extension element disposed at an end of the first housing unit that faces the rotor portion;
   a first rack having a first translational axis; and
   a first pinion assembly that includes:
      a first pinion that is coupled to the first rack;
      a shaft defining said main axis and having a first end and a second end, the shaft coupled both to the rotor and to the first pinion at the first end of the shaft;
      a bearing configured to receive the shaft and encircle the shaft at a point between the rotor and the second end of the shaft; and a first upper shaft housing and a first lower shaft housing proximal to the first pinion, wherein the first upper shaft housing is configured to engage the first rack above the first pinion and is directly mechanically attached to said structural extension element at a point outside of the radial extent of the rotor portion, and wherein the first lower shaft housing is configured to engage the first rack below the first pinion.

2. The mechanism according to claim 1, wherein at least one of the following conditions is satisfied:
  (a) wherein the first rack has a first upper sliding surface and a first lower sliding surface, the first lower sliding surface defining a first U-shaped channel having a height of the first U-shaped channel and a width of the first U-shaped channel; and
  (b) wherein the first upper shaft housing comprises a first wear surface configured to laterally slide upon the first upper sliding surface, and wherein the first lower shaft housing comprises a second wear surface, with the second wear surface configured to slide within the first U-shaped channel of the first lower sliding surface.

3. The mechanism according claim 2, wherein a separation between the first and second wear surfaces along the main axis is dimensioned to limit displacements of the first upper shaft housing and the first lower shaft housing along said main axis to maintain operable engagement between the first pinion and the first rack along the main axis during an operation of the mechanism.

4. The mechanism according to claim 3, wherein the mechanism additionally comprises a second pinion assembly that is coupled to the second end of the shaft, that includes an aperture dimensioned to receive the second end of the shaft, and that is configured such that
  in a first state of operation, a fastener is fully inserted into the aperture such that the shaft and the rotor are engaged; and
  in a second state of operation, the fastener is withdrawn by at least a fixed distance from the aperture, thereby disengaging the first end of the shaft from the rotor such that the first rack translates freely along the first translational axis when a force is applied to the sliding support mechanism in a direction parallel to the first translational axis.

5. The mechanism according to claim 4, wherein at least one of the following conditions is satisfied:
  (a) wherein, in the second state of operation in which the shaft is disengaged from the rotor, the motor assembly is configured to remain coupled to the first upper shaft housing; and
  (b) wherein the first upper sliding surface is formed of a first material characterized by a first hardness, and wherein the first wear surface comprises a second material characterized by a second hardness that is lower than the first hardness.

6. The mechanism according to claim 1, wherein the first lower shaft housing comprises at least two first rollers configured to run within the first U-shaped channel of the first lower sliding surface.

7. The mechanism according to claim 6,
  wherein the first upper shaft housing comprises a first wear surface configured to laterally slide upon the first upper sliding surface,
  wherein the first lower shaft housing comprises a second wear surface, with the second wear surface configured to slide within the first U-shaped channel of the first lower sliding surface, and wherein the second wear surface is disposed closer to a bottom of the first U-shaped channel than a surface of any of the at least two first rollers.

8. The mechanism according to claim 6, wherein at least one of the following conditions is satisfied: (i) a diameter of any of the at least two first rollers and an extent of the second wear surface along the first width of the first U-shaped channel are smaller than the first width of the first U-shaped channel, and (ii) wherein said diameter of any of the at least two first rollers is dimensioned to maintain the first pinion and the first rack in mutual alignment and operable engagement and to counter a torque applied to the first rack during operation of the motor assembly.

9. The mechanism according to claim 1, wherein at least one of the following conditions is satisfied:
  a) said structural extension element is configured as a first flange of the first housing unit, while the first upper shaft housing includes a second flange dimensioned such as to transversely protrude from the first upper shaft housing with respect to the main axis and beyond said radial extent of the rotor portion with respect to the main axis;
  b) at least one of the first flange and the second flange has a plurality of threaded openings therethrough; and
  c) the first and second flanges are removably fastened to one another such that the rotor portion is not fastened to the first upper housing and the rotor bearing housing is sandwiched between the first flange and the second flange.

10. The mechanism according to claim 1, wherein said gearbox includes a gear set configured to transfer a torque generated at the drive motor of said assembly to the rotor with an amplification factor of at least 100.

11. The mechanism according to claim 1, further comprising:
  a second rack and a second pinion, the second pinion coupled to the second rack,
    wherein the second rack has a second upper sliding surface and a second lower sliding surface, the second lower sliding surface defining a second U-shaped channel having a height of the second U-shaped channel and a width of the second U-shaped channel,
  wherein the shaft is coupled to the second pinion; and
  a second upper shaft housing and a second lower shaft housing proximal to the second pinon, with the second upper shaft housing configured to engage the second rack above the second pinion and the second lower shaft housing configured to engage the second rack below the second pinion,
    wherein the second upper shaft housing comprises a third wear surface configured to laterally slide upon the second upper sliding surface of the second rack;
    wherein the second lower shaft housing comprises a fourth wear surface, with the fourth wear surface configured to slide within the second U-shaped channel of the second lower sliding surface; and
    wherein the second lower shaft housing includes at least second two rollers dimensioned to run within the second U-shaped channel of the second lower sliding surface, the at least second two rollers dimensioned such as to maintain the second pinion and the second rack in mutual alignment and operable engagement to counter a torque applied to the second rack during operation of the motor assembly.

12. A sliding support mechanism comprising one or more mechanical assemblies among which each mechanical assembly includes:
- a motor assembly having a drive motor and a gearbox enclosed in a first housing unit, and a rotor portion dimensioned to be partially inserted in said first housing unit when the motor assembly is complete, the rotor portion containing a rotor bearing housing and a rotor passing therethrough,
  - wherein the first housing unit includes a structural extension element configured as a first flange that protrudes radially with respect to a main axis and beyond a radial extent of the rotor portion, said structural extension element disposed at an end of the first housing unit that faces the rotor portion;
- a rack having a rack gear and a pinion gear that is mechanically meshing with and coupled to the rack gear,
  - wherein the rack has an upper sliding surface and a lower sliding surface, the lower sliding surface defining a U-shaped channel having a height of the U-shaped channel and a width of the U-shaped channel;
- a shaft defining the main axis of the corresponding mechanical assembly and having a first end and a second end and coupled to the pinion gear;
- an upper shaft housing and a lower shaft housing proximal to the pinion gear;
  - wherein the upper shaft housing is configured to engage the rack gear above the pinion gear and the lower shaft housing is configured to engage the rack gear below the pinion gear;
  - wherein the upper shaft housing comprises a first wear surface configured to laterally slide on the upper sliding surface;
  - wherein the upper shaft housing includes a second flange dimensioned such as to transversely protrude from the upper shaft housing with respect to the main axis and beyond said radial extent of the rotor portion with respect to the main axis;
  - wherein the first flange and the second flange are removably fastened directly to one another; and
  - wherein the lower shaft housing comprises at least one of a protrusion along the main axis and at least two lower rollers, said protrusion containing a second wear surface configured to slide within the U-shaped channel, and said at least two lower rollers configured to run within the U-shaped channel.

13. The mechanism according to claim 12, wherein at least one of the following conditions is satisfied:
  (a) wherein a separation between the first and second wear surfaces along the main axis is dimensioned to limit displacements of the first upper shaft housing and the first lower shaft housing along said main axis to maintain the pinion gear and the rack gear in mutual operable engagement along the main axis during an operation of the mechanism; and
  (b) wherein the rotor portion is not fastened to the upper housing and the rotor bearing housing is sandwiched between the first flange and the second flange.

14. The mechanism according to claim 12,
  wherein a chosen sliding surface from the upper and lower sliding surfaces is formed of a first material characterized by a first hardness;
  wherein a chosen wear surface from the first and second wear surfaces comprises a second material characterized by a second hardness; and
  wherein at least one of the following conditions is satisfied:
    a) the second hardness is lower than the first hardness, and
    b) the second material is configured to reduce friction between said chosen sliding surface and said chosen wear surface during an operation of the mechanism.

15. The mechanism according to claim 12, wherein a width of said at least one of the protrusion along the main axis and the at least two lower rollers is dimensioned such that, during an operation of the mechanism, the rack gear and the pinion gear maintain operable meshing with one another in a direction transverse to the main axis.

* * * * *